United States Patent
Tamaoka

(10) Patent No.: US 7,988,810 B2
(45) Date of Patent: Aug. 2, 2011

(54) SLEEVE UNIT, METHOD OF MANUFACTURING THEREOF, AND MOTOR USING THE SLEEVE UNIT

(75) Inventor: Takehito Tamaoka, Kyoto (JP)

(73) Assignee: Nidec Corporation, Kyoto (JP)

(*) Notice: Subject to any disclaimer, the term of this patent is extended or adjusted under 35 U.S.C. 154(b) by 648 days.

(21) Appl. No.: 11/857,520

(22) Filed: Sep. 19, 2007

(65) Prior Publication Data
US 2008/0067890 A1 Mar. 20, 2008

(30) Foreign Application Priority Data

Sep. 20, 2006 (JP) .................. 2006-255107
Sep. 11, 2007 (JP) .................. 2007-234964

(51) Int. Cl.
*B29C 65/00* (2006.01)
*B29C 67/00* (2006.01)
*B32B 37/00* (2006.01)
*C09J 5/06* (2006.01)
*B31F 5/00* (2006.01)
*B65H 29/00* (2006.01)

(52) U.S. Cl. ......... 156/294; 156/296; 156/321; 156/556

(58) Field of Classification Search .......... 156/60, 156/292, 293, 294, 295, 296, 303.1, 311, 156/321, 556, 580, 581, 583.1, 583.4
See application file for complete search history.

(56) References Cited

U.S. PATENT DOCUMENTS

| | | | |
|---|---|---|---|
| 3,619,888 A | 11/1971 | Sawada et al. | |
| 5,533,811 A | 7/1996 | Polch et al. | |
| 5,628,569 A | 5/1997 | Hayakawa et al. | |
| 5,659,445 A | 8/1997 | Yoshida et al. | |
| 6,118,108 A * | 9/2000 | Ufford | 219/535 |
| 6,456,458 B1 | 9/2002 | Ichiyama | |
| 6,672,767 B2 | 1/2004 | Hajota et al. | |
| 6,836,388 B2 | 12/2004 | Nishimura et al. | |
| 6,914,358 B2 | 7/2005 | Tokunaga et al. | |
| 7,005,768 B2 | 2/2006 | Tamaoka et al. | |
| 7,021,829 B2 | 4/2006 | Tamaoka | |
| 7,059,052 B2 | 6/2006 | Okamura et al. | |
| 7,088,023 B1 | 8/2006 | Gomyo et al. | |
| 7,675,210 B2 | 3/2010 | Maekawa et al. | |
| 2002/0175577 A1 | 11/2002 | Yoshitsugu et al. | |
| 2003/0169952 A1 | 9/2003 | Yamashita et al. | |

(Continued)

FOREIGN PATENT DOCUMENTS

JP 02-107705 A 4/1990

(Continued)

OTHER PUBLICATIONS

Tamaoka; "Sleeve-Unit Manufacturing Method, Sleeve Unit, and Motor"; U.S. Appl. No. 11/276,863, filed Mar. 17, 2006.

(Continued)

*Primary Examiner* — Philip C Tucker
*Assistant Examiner* — Brian R Slawski
(74) *Attorney, Agent, or Firm* — Keating & Bennett, LLP

(57) ABSTRACT

An adhesive is applied to an inner surface of a sleeve housing, and a sleeve is relatively moved toward the sleeve housing from inserted into the sleeve housing. The adhesive is cured while a predetermined distance is maintained between a first bearing surface of the sleeve and a lower surface of a flange portion of the sleeve housing.

15 Claims, 12 Drawing Sheets

U.S. PATENT DOCUMENTS

| | | |
|---|---|---|
| 2003/0231813 A1 | 12/2003 | Gomyo et al. |
| 2004/0091187 A1 | 5/2004 | Aiello et al. |
| 2004/0145260 A1 | 7/2004 | Tamaoka et al. |
| 2004/0212921 A1 | 10/2004 | Herndon et al. |
| 2005/0025405 A1 | 2/2005 | Tamaoka |
| 2005/0062282 A1* | 3/2005 | Rosch et al. .................. 285/21.1 |
| 2005/0069232 A1 | 3/2005 | Aiello et al. |
| 2005/0274018 A1* | 12/2005 | Gomyo et al. ............. 29/898.02 |
| 2006/0051001 A1* | 3/2006 | Nishimura et al. ........... 384/100 |
| 2006/0059689 A1 | 3/2006 | Kagata et al. |
| 2006/0072242 A1 | 4/2006 | Tamaoka |
| 2006/0188187 A1* | 8/2006 | Kurimura et al. ............. 384/107 |
| 2006/0207098 A1* | 9/2006 | Tamaoka .................... 29/898.02 |
| 2008/0029212 A1 | 2/2008 | Tamaoka |

FOREIGN PATENT DOCUMENTS

| | | |
|---|---|---|
| JP | 07-116490 A | 12/1995 |
| JP | 08-007463 | 1/1996 |
| JP | 08-004230 Y2 | 2/1996 |
| JP | 10-306827 A | 11/1998 |
| JP | 2857304 | 11/1998 |
| JP | 2000-270512 | 9/2000 |
| JP | 2001-065552 | 3/2001 |
| JP | 2001-099141 | 4/2001 |
| JP | 2002-139029 | 5/2002 |
| JP | 2003-056555 | 2/2003 |
| JP | 2003-074543 | 3/2003 |
| JP | 2003-92867 | 3/2003 |
| JP | 2003-262217 | 9/2003 |
| JP | 2003-278758 A | 10/2003 |
| JP | 3465204 B2 | 11/2003 |
| JP | 2004-176816 | 6/2004 |
| JP | 2004-232651 | 8/2004 |
| JP | 2004-239387 A | 8/2004 |
| JP | 2006-077872 | 3/2006 |
| JP | 2006-105237 A | 4/2006 |
| WO | WO 2006051872 A1 * | 5/2006 |

OTHER PUBLICATIONS

Tamaoka; "Sleeve, Sleeve Unit, Motor, and Method for Manufacturing Sleeve and Sleeve Unit"; U.S. Appl. No. 11/834,729, filed Aug. 7, 2007.

* cited by examiner

SLEEVE UNIT, METHOD OF MANUFACTURING THEREOF, AND MOTOR USING THE SLEEVE UNIT

BACKGROUND OF THE INVENTION

1. Field of the Invention

The present invention generally relates to a sleeve unit used for a fluid dynamic bearing assembly, a method of manufacturing the sleeve unit, and a motor using the fluid dynamic bearing assembly to which the sleeve unit is installed.

2. Description of the Related Art

Conventionally, a recording disk drive unit such as a hard disk device includes a spindle motor (hereinafter, simply referred to as "motor") for rotary driving a recording disk. In such a bearing assembly utilizing fluid dynamic pressure, a thrust bearing portion or a radial bearing portion are formed with a shaft, a sleeve to allow the shaft to be inserted thereinto, and the like.

The Japanese laid open patent publication No. 2003-262217 discloses a spindle motor having a bearing unit with a sleeve inserted in a sleeve housing and a shaft to a tip end of which a thrust plate is attached. In the spindle motor, thrust bearing portions are defined in a gap defined between an upper end surface of the sleeve housing and a lower surface of the rotor hub, and in a gap between a lower end surface of the sleeve and an upper surface of the thrust plate.

The Japanese laid open patent publication No. 2006-77872 discloses a bearing unit having a similar configuration disclosed in the Japanese laid open patent publication No. 2003-262217. In the bearing unit disclosed in the Japanese laid open patent publication No. 2006-77872, a sleeve having dynamic pressure generating grooves arranged in axially upper and lower end surfaces thereof, and thrust bearing portions are defined in a gap between the upper end surface of the sleeve and a lower surface of the rotor hub, and in a gap between the lower end surface of the sleeve and the upper surface of the thrust plate.

In the bearing unit disclosed in the Japanese laid open patent publication No. 2006-77872, the upper end surface of the sleeve is arranged axially above an upper end surface of the housing. When the upper end surface of the housing is arranged axially above the upper end surface of the sleeve, the efficiency of the motor is degraded. However, when the upper end surface of the sleeve is arranged axially above the upper end surface of the housing, the upper end surface of the sleeve may come in contact with the lower surface of the rotor hub, and the upper end surface in which the dynamic pressure generating grooves are formed may be worn out. The scratches and the damages on the surface in which the dynamic pressure generating grooves are formed may cause the seizure of the bearing unit and the like troubles.

SUMMARY OF THE INVENTION

According to one preferred embodiment of the present invention, a method of manufacturing a sleeve unit having a sleeve and a sleeve housing is provided. The method includes a step of arranging the sleeve in a hollow, substantially cylindrical shape centered on a center axis, having an upper bearing surface on a upper axial side thereof, and the sleeve housing in a hollow, substantially cylindrical shape having an inner diameter substantially the same or greater than an outer diameter of the sleeve, in a manner axially separated from each other. In the method, the sleeve housing has a flange portion and a lower portion arranged axially below the flange portion, a lower surface of the flange portion approximately radially extending to the lower portion. The method further includes a step of moving the sleeve toward the sleeve housing relative to each other along the center axis and inserting the sleeve into the sleeve housing to set a distance along the center axis between the upper bearing surface and the lower surface to approximately a predetermined distance. The method further includes a step of fixing the sleeve to the sleeve housing.

In the method according to the preferred embodiments of the present invention, a radially outer diameter of the flange portion is configured to have a greater than a radially outer diameter of the lower portion. In addition, in the step of moving the sleeve and the sleeve housing relative to each other, the upper bearing surface of the sleeve is brought into contact with a lower surface of a sleeve holding portion and is biased toward the sleeve holding portion, the lower surface of the flange portion of sleeve housing is brought into contact with an upper surface of a sleeve housing holding portion and is biased toward the housing holding portion, and a distance along the center axis between the lower surface of the sleeve holding portion and the upper surface of the housing holding portion is set to the predetermined distance.

According to the preferred embodiment of the present invention, the position of the upper bearing surface of the sleeve relative to the lower surface of the flange portion of the sleeve housing can be easily and accurately determined.

With the first bearing surface of the sleeve and the lower surface of the flange portion whose positional relationship is highly accurately determined, a clearance of a gap defined between the first bearing surface and a lower surface of the rotor hub opposing to the bearing surface via the gap is accurately maintained, preventing the degradation of a thrust dynamic pressure bearing.

With a sleeve unit manufactured by the method according to the preferred embodiments of the present invention, a motor having superior reliability and durability can be provided.

Other features, elements, advantages and characteristics of the present invention will become more apparent from the following detailed description of preferred embodiments thereof with reference to the attached drawings.

DETAILED DESCRIPTION OF THE PREFERRED EMBODIMENTS

Figure 1:
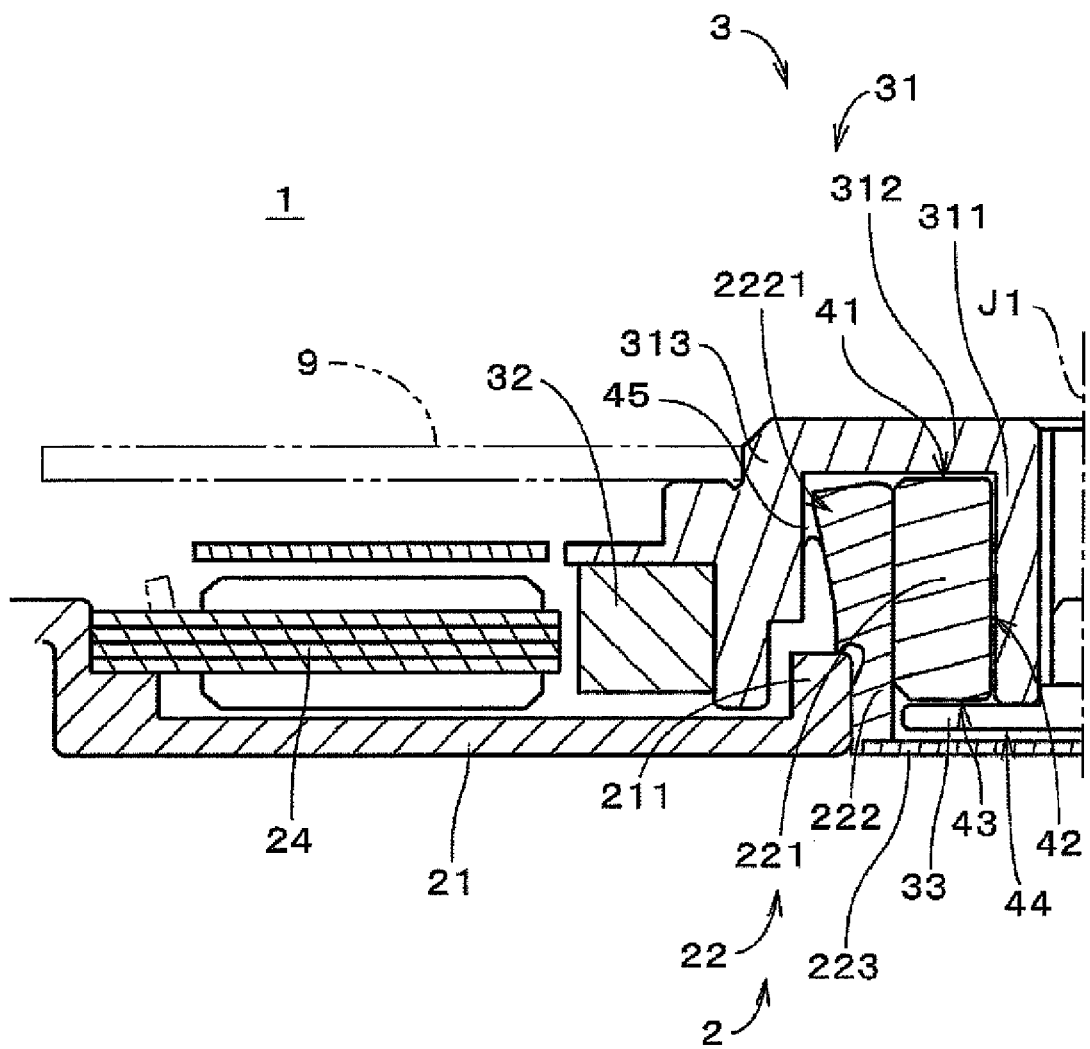
FIG. 1 is a vertical cross sectional view illustrating a motor according to a first preferred embodiment of the present invention.

With reference to FIGS. 1 through 10, preferred embodiments of the present invention will be described in detail. It is noted that, in the description of the present invention, positional relations and directions of respective members described as up, down, left, and right simply indicate positional relations and directions in the drawings, and do not indicate positional relations and directions when actually incorporated in equipment.

First Preferred Embodiment

FIG. 1 is a vertical cross sectional view of a motor 1 for driving a data storage disk in a storage disk drive according to a preferred embodiment of the present invention. FIG. 1 shows only a left half of a cross section of the motor 1 including a central axis J1 (which is also a central axis of a sleeve unit 22 to be described later).

The motor 1 includes a static portion 2 as a stator assembly and a rotor portion 3. The rotor portion 3 is supported by the static portion 2 via a bearing assembly utilizing fluid dynamic pressure of lubricant so as to be rotatable around the central axis J1. In the following description, for convenience, a rotor portion 3 side along the center axis is referred to as an upper side of the motor 1, and a static portion 2 side along the center axis is referred to as a lower side of the motor 1, but does limit the orientation in an actual installation.

The rotor portion 3 includes a rotor hub 31 and a rotor magnet 32. A center of the rotor hub 31 is connected with a shaft 311 extending downwards from the rotor hub 31. The rotor magnet 32 is attached to the rotor hub 31 and arranged around the central axis J1. The rotor hub 31 and the shaft 311 are formed as a single member made of stainless steel and the like. The rotor hub 31 includes a discoid portion 312 having a substantially circular disk shape and a cylindrical portion 313 having a substantially cylindrical shape. The discoid portion 312 extends perpendicularly to the central axis J1 from an upper end part of the shaft 311. The cylindrical portion 313 extends downward along the center axis from a radially outer end of the discoid portion 312. A thrust plate 33 in a substantially circular disk shape is attached to a lower distal end of the shaft 311. A recording disk 9 is loaded on an upper surface of the rotor hub 31 as indicated with chain double-dashed line.

The static portion 2 includes a base plate 21 serving as a base portion for supporting each part of the static portion 2, a sleeve unit 22 in a substantially cylindrical shape, and an armature 24. The shaft 311 is inserted into the sleeve unit 22. The armature 24 is attached to the base plate 21 around the sleeve unit 22.

The armature 24 is attached to the base plate 21 from an upper side by press fitting or adhesive joining, and torque around the central axis J1 is generated between the armature 24 and the rotor magnet 32 arranged around the shaft 311. In other words, the stator 24 and the rotor magnet 32 function as a drive mechanism for rotating the rotor portion 3 with respect to the static portion 2.

At a center of the base plate 21, there is provided a sleeve attaching portion 211 having a substantially cylindrical shape and extending upwards around the central axis J1. The sleeve unit 22 includes a sleeve 221, a sleeve housing 222 in a substantially cylindrical shape as a sleeve supporting member, and a seal cap 223 in a substantially circular disk shape, and is inserted into the sleeve attaching portion 211. The sleeve 221 is formed into a substantially cylindrical shape around the central axis J1, and the shaft 311 is inserted into the sleeve 221. The sleeve housing 222 has an inner circumferential surface to which an outer circumferential surface of the sleeve 221 is attached. The seal cap 223 seals an opening at a lower side of the sleeve housing 222. The sleeve unit 22 is fixed to the base plate 21 by joining with adhesive, press-fitting, welding, caulking, and the like.

Figure 2:
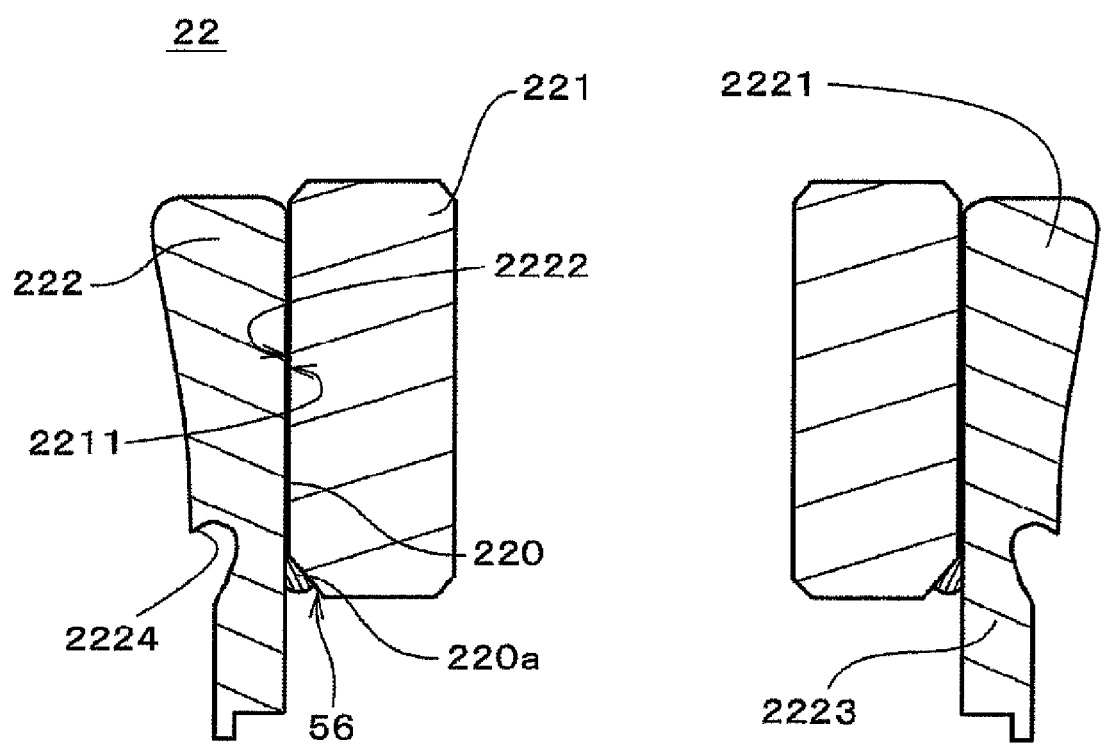
FIG. 2 is a vertical cross sectional view of a sleeve unit used in the motor illustrated in FIG. 1.

As illustrated in FIG. 2, the sleeve unit 222 includes a lower portion 2223 having a substantially cylindrical shape and a flange portion 2221. The lower portion 2223 of the sleeve housing 222 is inserted into a hole defined by a radially inner surface of the sleeve attaching portion 211 and is attached to the sleeve attaching portion 211. The flange portion 2221 is arranged axially above the lower portion 2223 and has an outer diameter greater than that of the lower portion 2223. A lower surface 2224 of the flange portion 2221 radially inwardly extends and reaches to the lower portion 2223. When the sleeve unit 22 is attached to the base plate 21, the lower surface 2224 of the flange portion 2221 comes in contact with an upper end part of the sleeve attaching portion 211 for axially positioning the sleeve unit 22 on the base plate 21. It should be noted that the lower surface 2224 and the sleeve attaching portion 211 may not be abutted the sleeve as long as the positioning of the sleeve unit 22 and the base plate 21 can accurately performed.

The sleeve 221 is molded from a porous, oil-impregnated sintered material, the substance of which is not particularly limited; a cast and sintered object is used, with various metal powders, metal-compound powders, and non-metal powders being the source material. For example, the sleeve 221 may be made of the source material such as Fe—Cu, Cu—Sn, Cu—Sn—Pb, and/or Fe—C, and has a thermal expansion coefficient of $12.9*10-6$/degree Celsius.

The sleeve housing 222 is made of a material having a thermal expansion coefficient smaller than the source material defining the sleeve 221. For example, the sleeve housing 222 may be made of SUS420J2 (thermal expansion coefficient: $10.4*10-6$/degree Celsius), DHS-1 (registered mark), SF20T, and/or the like. The sleeve housing 222 can be formed by cutting a metal material, pressing a metal plate, injection molding with a resin material, and/or the like.

Through the configuration, thermal expansion of the sleeve 221 caused by that of the sleeve housing 222 can be prevented.

In the motor 1 according to the preferred embodiment of the present invention, micro-gaps are provided, in between a lower surface of the discoid portion 312 of the rotor hub 31, and an upper end surface of the sleeve 221 (an upper gap 41); in between an radially inner surface of the sleeve 221, and a radially outer surface of the shaft 311 (a side gap 42); in between a lower end surface of the sleeve 221, and an upper surface of the thrust plate 33 (a first lower gap); in between a lower surface of the thrust plate 33, and an upper surface of the seal cap 223 (a second lower gap 44); and in between a radially outer surface of the flange portion 2221 of the sleeve housing 222, and a radially inner surface of the cylindrical section 313 of the rotor hub 31 (an outside gap 45).

The outer surface of the flange portion 2221 is inclined such that an outer diameter thereof is gradually decreased toward an axially lower direction. The cylindrical section 313 of the rotor hub 31 is formed so that the radially inner surface which opposes the radially outer surface of the flange portion 2221 is of constant diameter. Through the configuration, a boundary surface of the lubricating oil retained in the above mentioned gaps meets outside air in the outside gap 45, and is forms a meniscus under the agency of capillary action and surface tension, defining a taper seal, whereby the outside gap 45 functions as an oil buffer, preventing outflow of the lubricating oil.

The upper end surface and the lower end surface of the sleeve 221 respectively include dynamic pressure generating groove arrays generating in the lubricating oil the dynamic pressure supporting the rotor portion 3 when the rotor portion 3 rotates. Through the configuration, thrust dynamic-pressure bearing portions are defined in the upper gap 41 and in the first lower gap 43 respectively. Alternatively, the lower surface of the thrust plate or the upper surface of the seal cap may include the dynamic pressure generating groove array to define the thrust dynamic pressure bearing portion in the second lower gap 44. Further, the radially inner surface of the sleeve 221 includes a radial dynamic pressure generating groove array for generating the dynamic pressure in the lubricant in the lubricating oil retained in the side gap 42, so that a radial dynamic pressure bearing portion is defined in the side gap 42.

As described above, in the motor 1, the sleeve unit 22, the seal cap 223, the shaft 311, the discoid portion 312 and the thrust plate 33 (as well as the lubricant oil) define the bearing assembly utilizing fluid dynamic pressure. Through the configuration, the rotor portion 3 is non-contact supported, via the lubricating oil, by the fluid dynamic bearing assembly, enabling the rotor portion 3 and the data storage disk 9 arranged thereon to rotate with high precision and low noise. Particularly, the fluid dynamic bearing assembly in which the upper gap 41, the side gap 42, the first lower gap 43, the second lower gap 44, and the outside gap 45 are continuously filled with lubricant oil can further suppress unusual contact between the shaft 311 and the sleeve 221 due to air-bubbles generated in the lubricant oil, leakage of the lubricant due to expansion of air in the bearing assembly.

FIG. 2 is an cross sectional view illustrating the sleeve unit 22 (except for the seal cap 223). In the sleeve unit 22, the sleeve 221 is inserted into the sleeve housing 222 with a slight space from an inner surface 2222 of the sleeve housing 222, that is, running fitted. The sleeve 221 is fixed to the sleeve housing 222 with adhesive 220 interposing between the inner surface 2222 of the sleeve housing 222 and an outer surface 2211 of the sleeve 221. A radially outer portion of the lower end surface of the sleeve 221 is chamfered to form a connecting surface connecting the second bearing surface 2214 and the outer surface 2211, wherein the diameter of the second bearing surface 2214 is smaller than that of the outer surface 2211 (i.e., to form an adhesive holding portion 56 described later). The adhesive 220 is held between the adhesive holding portion 56 and the inner surface 2222 of the sleeve housing 222 continuously from between the sleeve housing 222 and the sleeve 221. Hereinafter a portion of the adhesive 220 arranged between the adhesive holding portion 56 and the inner surface 2222 of the sleeve housing 222 is referred to as an extra-adhesive 220a. On the other hand, the adhesive 220 is merely held between an upper end part of the sleeve 221 and the sleeve housing 222.

The extra-adhesive 220a functions as a wedge and prevents the sleeve 221 from being displaced with respect to the sleeve housing 222 even when heavy downward load is applied to the sleeve 221 via the rotor hub 31. That is, the extra-adhesive 220a prevents destruction of adhesive joining between the sleeve 221 and the sleeve housing 222.

Figure 3A:
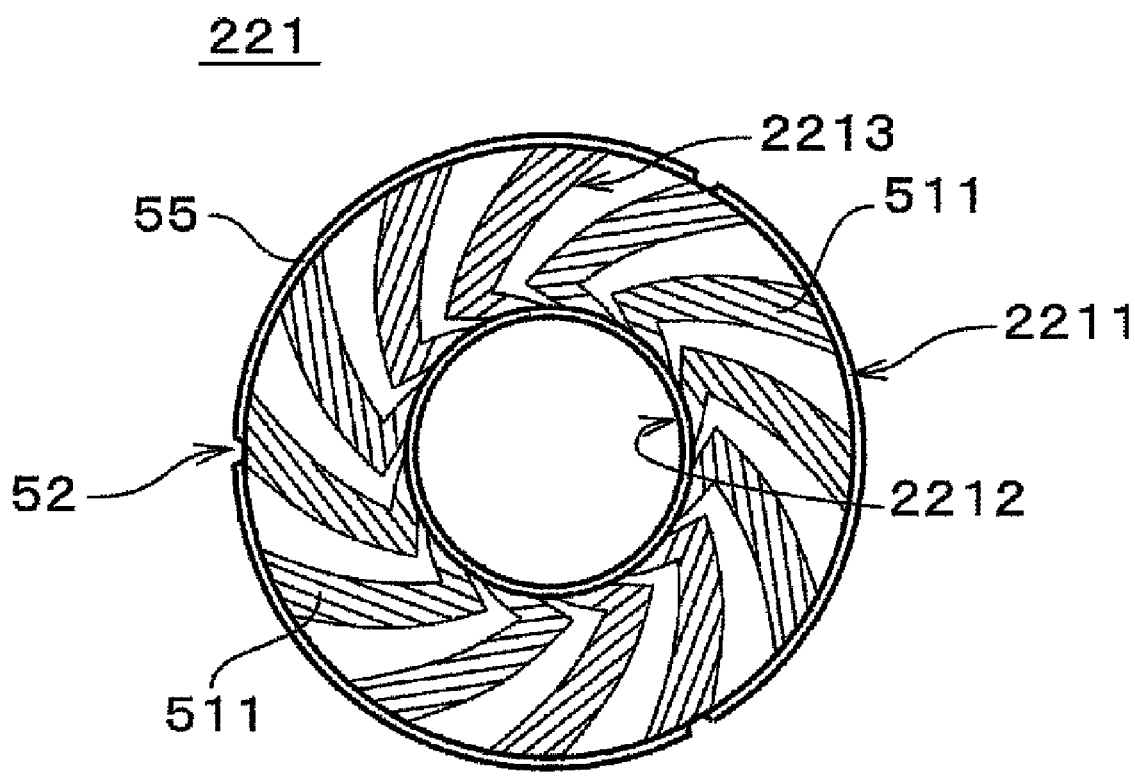
FIG. 3A is a plan view illustrating a sleeve of the sleeve unit.
Figure 3B:
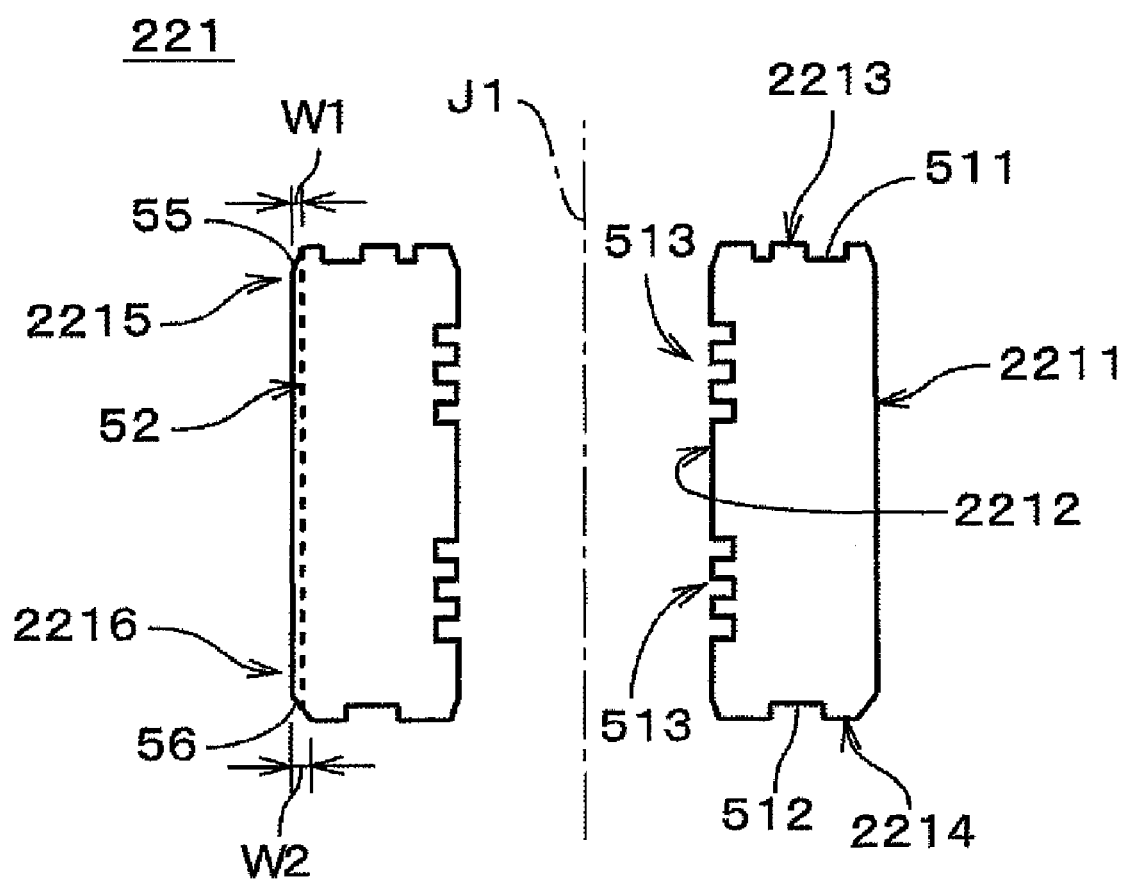
FIG. 3B is a vertical cross sectional view illustrating a sleeve of the sleeve unit.
Figure 3C:
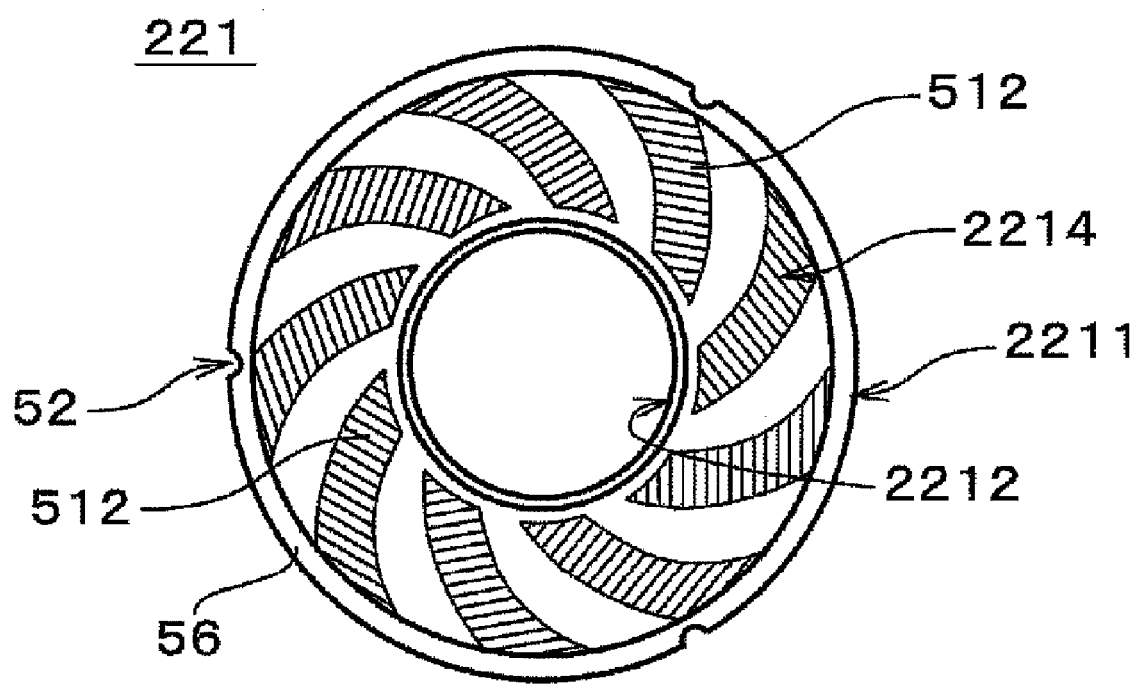
FIG. 3C is a bottom plan view illustrating a sleeve of the sleeve unit.

FIGS. 3A to 3C are respectively a plan view, a vertical cross sectional view, and a bottom plan view of the sleeve 221. In FIGS. 3A and 3C, the dynamic pressure generating groove arrays are marked with parallel diagonal lines, while in FIG. 3B, parallel diagonal lines for representing the cross section are not illustrated. Further, in FIG. 3B, the thrust dynamic pressure generating groove arrays and the radial dynamic pressure groove arrays are emphatically illustrated.

Each of the outer surface 2211 and the inner surface 2212 of the sleeve 221 has a substantially cylindrical shape. On the upper end surface of the sleeve 221 a first surface 2213 is defined, and on a lower end surface of the sleeve 221 a second bearing surface 2214 is defined.

In the first bearing surface 2213 and the second bearing surface 2214, dynamic pressure generating groove arrays including a plurality of grooves arrayed in a predetermined manner are arranged respectively. In the present preferred embodiment of the present invention, dynamic pressure generating grooves are arrayed in a herringbone shape in the first bearing surface 2213 of the sleeve 221, defining a first groove array 511 in the first bearing surface 2213. Similarly, dynamic pressure generating grooves are arrayed in a spiral shape in the second bearing surface 2214 of the sleeve 221, defining a second groove array 512 in the second bearing surface 2214. It should be noted that the dynamic pressure generating grooves may be arrayed in a spiral shape in the first bearing surface 2213, and the dynamic pressure generating grooves may be arrayed in a herringbone shape in the second bearing surface 2214. Furthermore, the dynamic pressure generating grooves may be arrayed in a same manner (e.g., in the spiral shape, in the herringbone shape, and the like) in the first and second bearing surface 2213, 2214.

Through the configuration in which the first bearing surface 2213 is defined by the upper end surface of the sleeve 221, a diameter of the thrust dynamic pressure bearing portion can be reduced, materializing lower power consumption of the motor 1.

Further, dynamic pressure grooves are arrayed in a herringbone shape at upper and lower portions on the inner surface 2212 of the sleeve 221, defining radial groove arrays 513 axially separated from each other, and three communicating grooves 52 extending along the central axis J1 are arranged in the outer surface 2211 while equiangularly spaced apart from one another. The communicating grooves 52 reduce difference in pressure between the upper gap 41 and the first lower gap 43 (see FIG. 1) to prevent generation of bubbles in the fluid dynamic bearing assembly.

As illustrated in FIG. 3B, an outer peripheral edge of the upper end portion 2215 (hereinafter, referred to as "first end portion 2215") to face the rotor hub 31 of the sleeve 221 is chamfered to have a liner cross section. In other words, a connecting surface which connects the outer surface of the sleeve 2211 and a first bearing surface having a smaller diameter than that of the outer surface 2211 is defined. An outer peripheral edge of a lower end portion 2216 (hereinafter, referred to as "second end portion") arranged an axially opposite side of the first end portion 2215 are also chamfered to have liner cross sections. Angles between the respective chamfered shapes and the central axis J1 may be arbitrarily set.

A radial width W1 of a first chamfered end 55 formed by chamfering the outer peripheral edge of the first end portion 2215 is smaller than a radial width W2 of the adhesive holding portion 56 formed by chamfering the outer peripheral edge of the second end portion 2216. As illustrated in FIG. 2, the adhesive holding portion 56 holds the extra-adhesive 220a. More specifically, a width in the axial direction and the width in the radial direction of the adhesive holding portion 56 are set to be twice larger than the width in the direction of the central axis J1 and the width in the radial direction of the first chamfered end 55, respectively.

Figure 4:
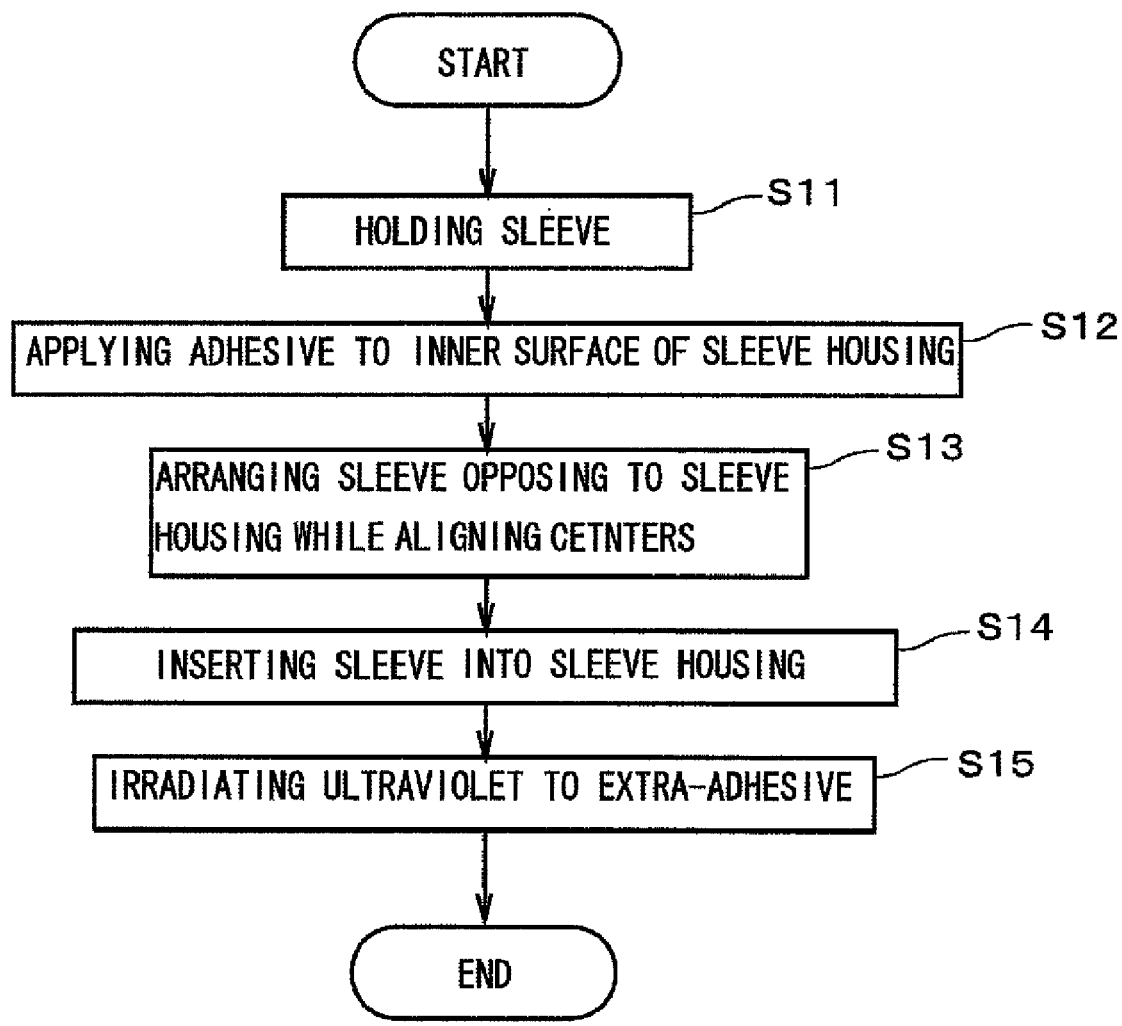
FIG. 4 is a chart illustrating flow of manufacturing the sleeve unit illustrated in FIG. 2.
Figure 5:
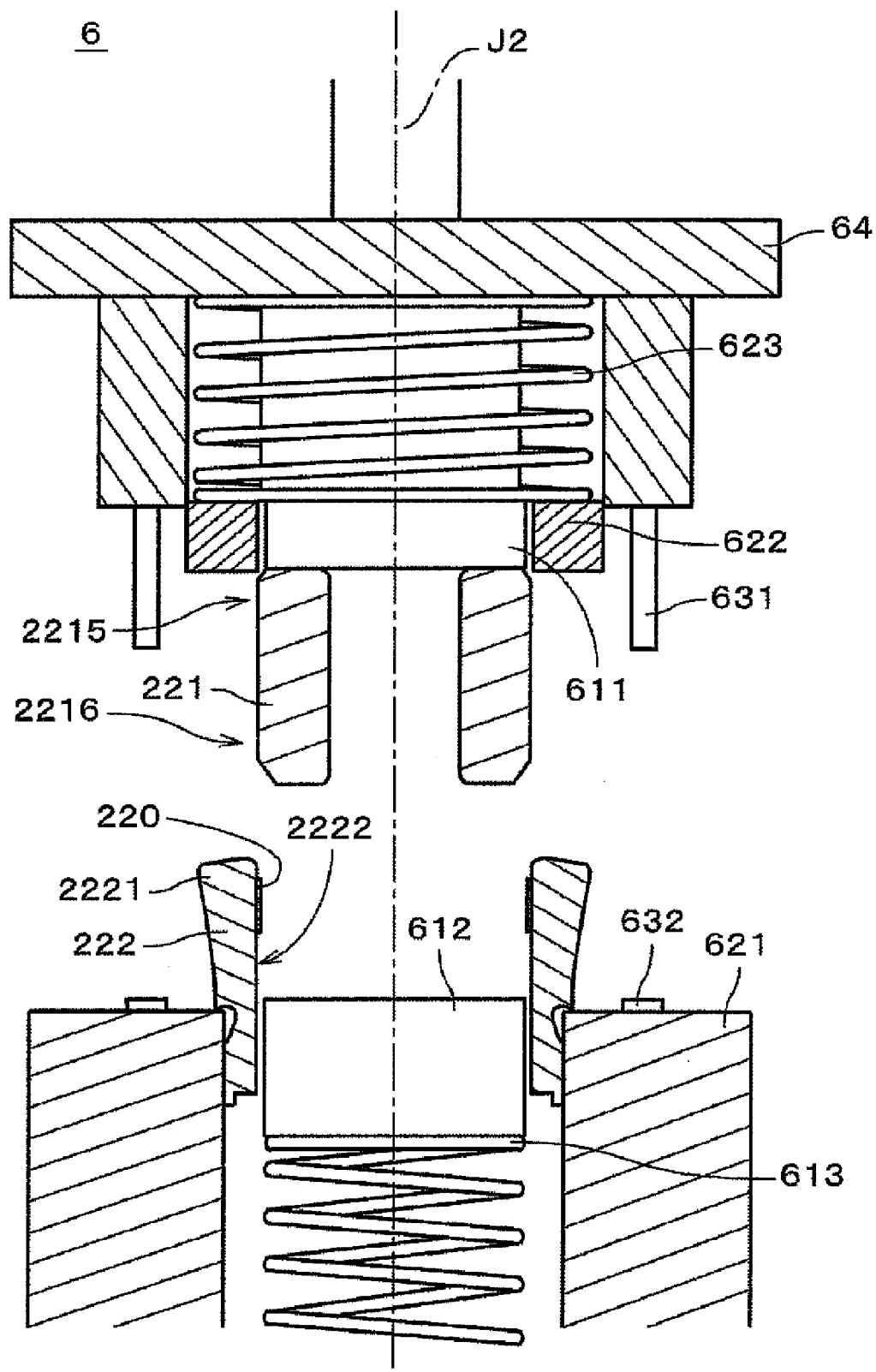
FIG. 5 is a view illustrating manufacture of the sleeve unit with a sleeve unit assembling device.
Figure 6:
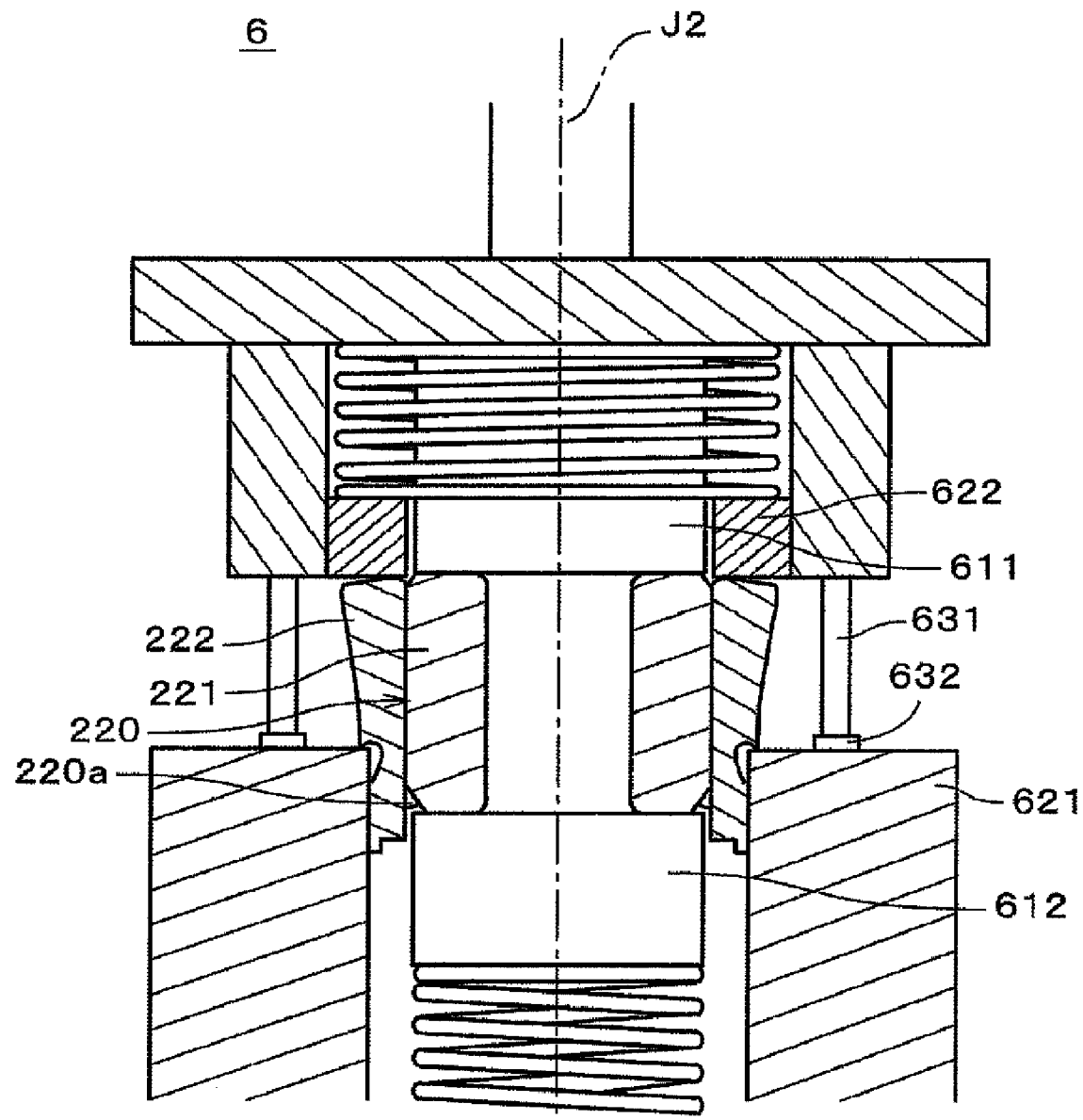
FIG. 6 is another view illustrating manufacture of the sleeve unit with a sleeve unit assembling device.

FIG. 4 is a chart illustrating flow of manufacturing the sleeve unit 22 (except for the seal cap 223). FIGS. 5 and 6 are views illustrating manufacture of the sleeve unit 22 with a sleeve unit assembling device 6.

In order to manufacture the sleeve unit 22, as illustrated in FIG. 5, the first end portion 2215 of the sleeve 221 is firstly adsorbed from an upper side, so that the sleeve 221 is held by the sleeve holding portion 611 (step S11 in FIG. 4). Then, the anaerobic and ultraviolet curing adhesive 220 is applied to the inner surface 2222 of the sleeve housing 222 (step S12), and the sleeve housing 222 is supported on a housing holding portion 621 to be engaged with the lower surface of the flange portion 2221 while facing the second end portion 2216 of the sleeve 221. In this step, the sleeve 221 and the sleeve housing 222 are held such that centers thereof are aligned with a central axis J2 of the sleeve unit assembly device 6 (step S13).

Below the sleeve 221, a first biasing portion 612 is attached to a lower supporting portion (not illustrated) via a first coil spring 613. Above the sleeve housing 222, a second biasing portion 622 radially surrounding the sleeve holding portion 611 is attached to an upper supporting portion 64 via a second coil spring 623. A downward pin 631 is indirectly fixed to the upper supporting portion 64 via a block, and a pin contacting portion 632 facing the pin 631 is fixed onto the housing holding portion 621.

After the sleeve 221 and the sleeve housing 222 are arranged to the sleeve holding portion 611 and the housing holding portion 621, the upper supporting portion 64 then descends such that the sleeve holding portion 611 is brought closer to the housing holding portion 621, and the sleeve 221 is inserted into the sleeve housing 222 from the second end portion 2216 (step S14).

In course of insertion, the second end portion 2216 of the sleeve 221 is brought into contact with the first biasing portion 612, and the first coil spring 613 is elastically deformed so that the sleeve 221 is biased by the first biasing portion 612 toward the sleeve holding portion 611. After the sleeve 221 has contacted the first biasing portion 612, adsorption of the sleeve 221 by the sleeve holding portion 611 may be halted.

At the same time, in course of inserting the sleeve 221, the upper portion of the sleeve housing 222 is brought into contact with the second biasing portion 622, so that the second coil spring 623 is elastically deformed and the sleeve housing 222 is biased toward the housing holding portion 621.

Then, as illustrated in FIG. 6, when a distal end of the pin 631 contacts the pin contacting portion 632, insertion of the sleeve 221 into the sleeve housing 222 is halted. Accordingly, a relative position of the housing holding portion 621 with respect to the sleeve holding portion 611 is accurately determined, and relative positions in the direction of the central axis J2 of the sleeve 221 in contact with the sleeve holding portion 611 and the sleeve housing 222 in contact with the housing holding portion 621 are accurately determined.

During insertion, the adhesive 220 is spread by the second end portion 2216 of the sleeve 221 such that the adhesive 220 is held between the outer surface 2211 of the sleeve 221 and the inner surface 2222 of the sleeve housing 222. As illustrated in FIG. 2, the extra-adhesive 220a pushed out (also illustrated in FIG. 6) is held between the adhesive holding portion 56 of the sleeve 221 and the inner surface 2222 of the sleeve housing 222. The amount of the adhesive 220 to be applied in step S12 is predetermined such that the pushed out extra-adhesive 220a is appropriate in amount while variation in applied amount is taken into consideration.

Thereafter, the sleeve 221 and the sleeve housing 222 are held for a predetermined period of time (such as for two minutes), and the anaerobic adhesive 220 not in contact with atmosphere is cured between the outer surface of the sleeve 221 and the inner surface of the sleeve housing 222, so that the sleeve 221 is fixed to the sleeve housing 222.

The extra-adhesive 220a held in the adhesive holding portion 56, that is, exposed, is irradiated with ultraviolet and cured, completing manufacture of the essential part of the sleeve unit 22 (step S15). The sleeve holding portion 611 and the housing holding portion 621 may be separated from each other, and the sleeve 221 and the sleeve housing 222 may be taken out prior to irradiating ultraviolet to cure the extra-adhesive 220a.

In the manufacturing method described above, a relative position of the first bearing surface 2213 with respect to the lower surface 2224 of the flange portion 2221 can be easily and accurately determined with use of the sleeve unit assembling device 6. Since the relative position is accurately determined with the sleeve unit assembling device 6, some portions of the sleeve housing 222, such as the flange portion 2221 may not be processed with a great dimensional precision, making the manufacturing cost of the sleeve housing 222 lower.

In the manufacturing method of the sleeve unit 22 according to the preferred embodiment of the present invention, the adhesive 220a is held by the adhesive holding portion 56, and the position of the adhesive 220 to be applied and the direction of the sleeve 221 to be inserted are determined such that the adhesive 220 is not pushed out to the side of the first end portion 2215, thereby preventing deterioration in performance of the thrust bearing portion in the upper gap 41 shown in FIG. 1 due to adhesion of the adhesive 220 to the first bearing surface 2213.

Moreover, it is possible to increase the amount of the adhesive to be applied without requiring work of removing the adhesive and to prevent contact of the adhesive with the thrust plate 33. Therefore, adhesive strength can be easily increased while preventing deterioration in performance of the thrust bearing portion around the thrust plate 33.

Since the space between the thrust plate 33 and the inner peripheral surface of the sleeve housing 222 is relatively made large, the adhesive merely affects the thrust bearing portions in the first lower space 43 and the second lower space 44 even if the adhesive 220a is spread from the adhesive holding portion 56 toward the sleeve housing 222.

As the chamfered shape at the outer peripheral end of the first end portion 2215 can be made small, an area of the upper bearing surface 2213 of the sleeve 221 can be made large, maintaining the dynamic pressure to be high. Further, the dynamic pressure generating grooves can be arrayed in the herringbone shape due to a large bearing surface, realizing further increased performance of the thrust bearing portion (in the upper gap 41).

As already described, because the partial adhesive 220a held by the adhesive holding portion 56 functions as the wedge, joint strength between the sleeve 221 and the sleeve housing 222 can be increased against force such as impact from the thrust direction applied from the rotor portion 3 to the sleeve 221. As a result, length of fastening the sleeve 221 and the sleeve housing 222 in the axial direction can be made shorter, thereby realizing a thinner motor 1.

As the anaerobic and ultraviolet curing adhesive is used in manufacture of the sleeve unit 22, it is possible to easily cure the adhesive 220 held in the space between the sleeve 221 and the sleeve housing 222 as well as the extra-adhesive 220a pushed out of the gap, thereby simplifying the manufacture of the sleeve unit 22.

Since the sleeve 221 is attached to the sleeve housing 222 by running fitting in manufacture of the sleeve unit 22, it is possible to prevent strong friction between the outer surface 2211 of the sleeve 221 and the inner surface 2222 of the sleeve housing 222 during insertion of the sleeve 221. Therefore, deformation of the bearing surfaces of the sleeve 221 is restricted. Thus, the technique of fixing the sleeve 221 and the sleeve housing 222 with adhesive according to the preferred embodiments of the present invention is suited particularly for a case where the sleeve 221 is made of porous material such as a sinter, which is relatively weaker than solid material.

Second Preferred Embodiment

Figure 7:
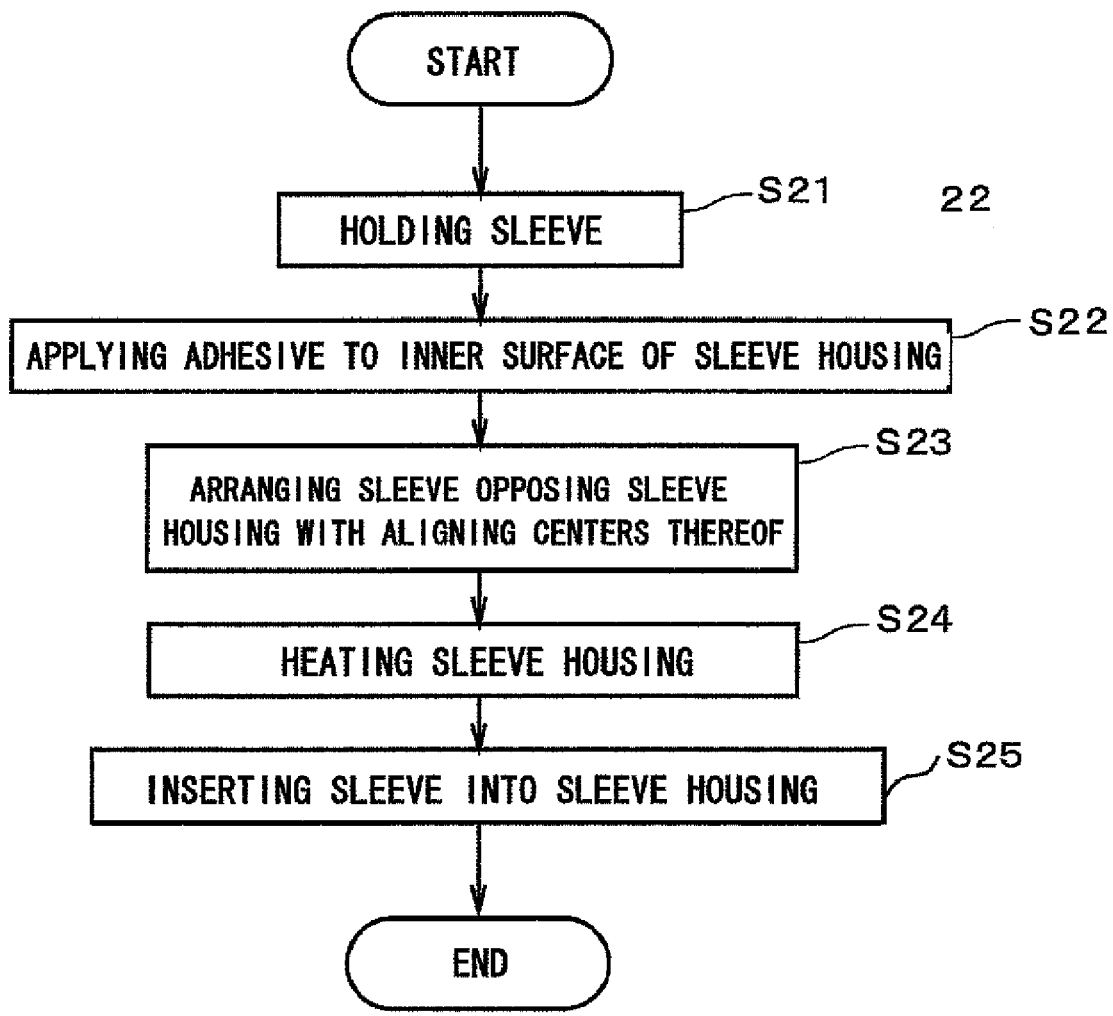
FIG. 7 is a chart illustrating a process flow of manufacturing a sleeve unit according to a second preferred embodiment of the present invention.
Figure 8:
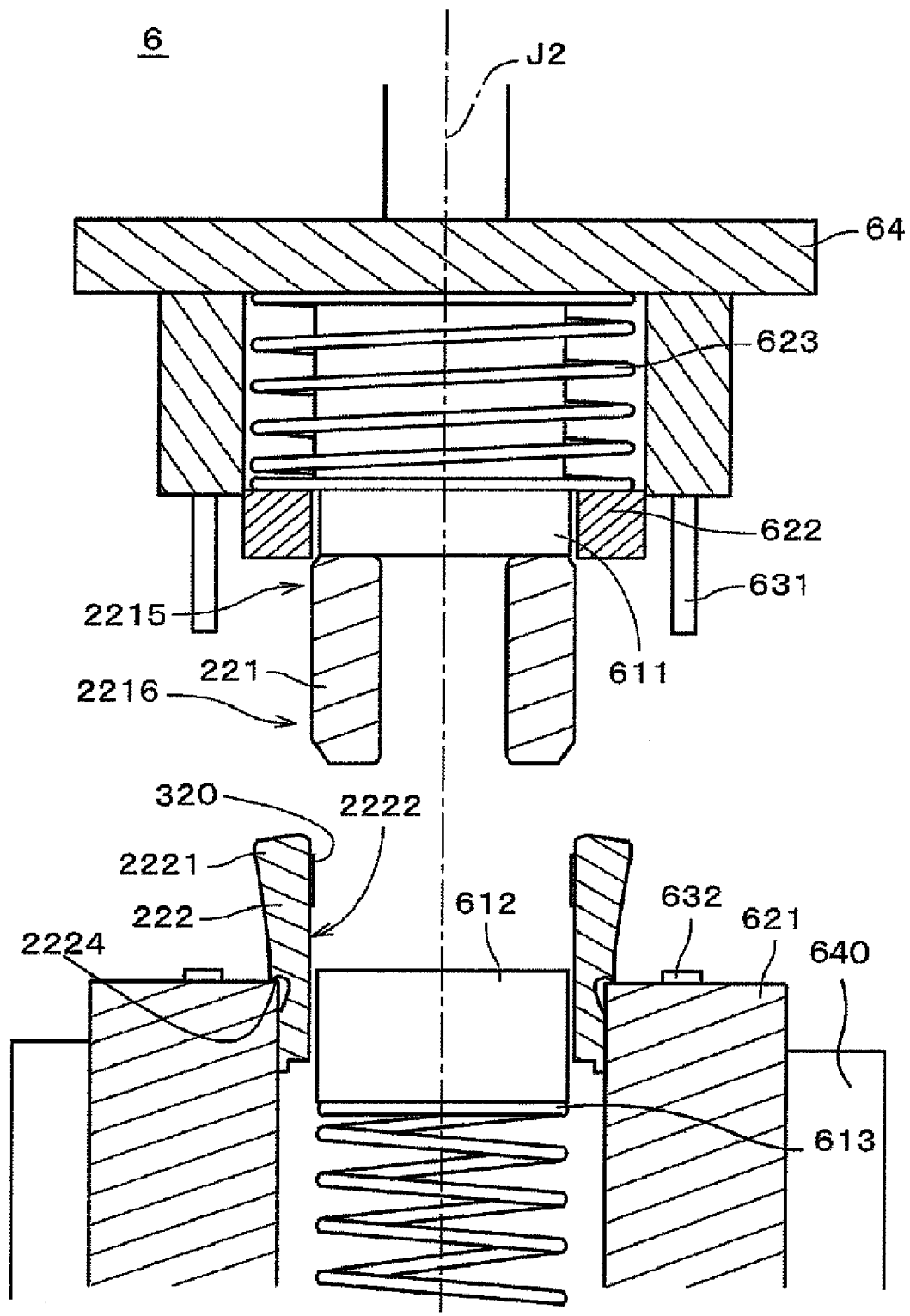
FIG. 8 is a view illustrating manufacture of the sleeve unit with a sleeve unit assembling device according to the second preferred embodiment of the present invention.
Figure 9:
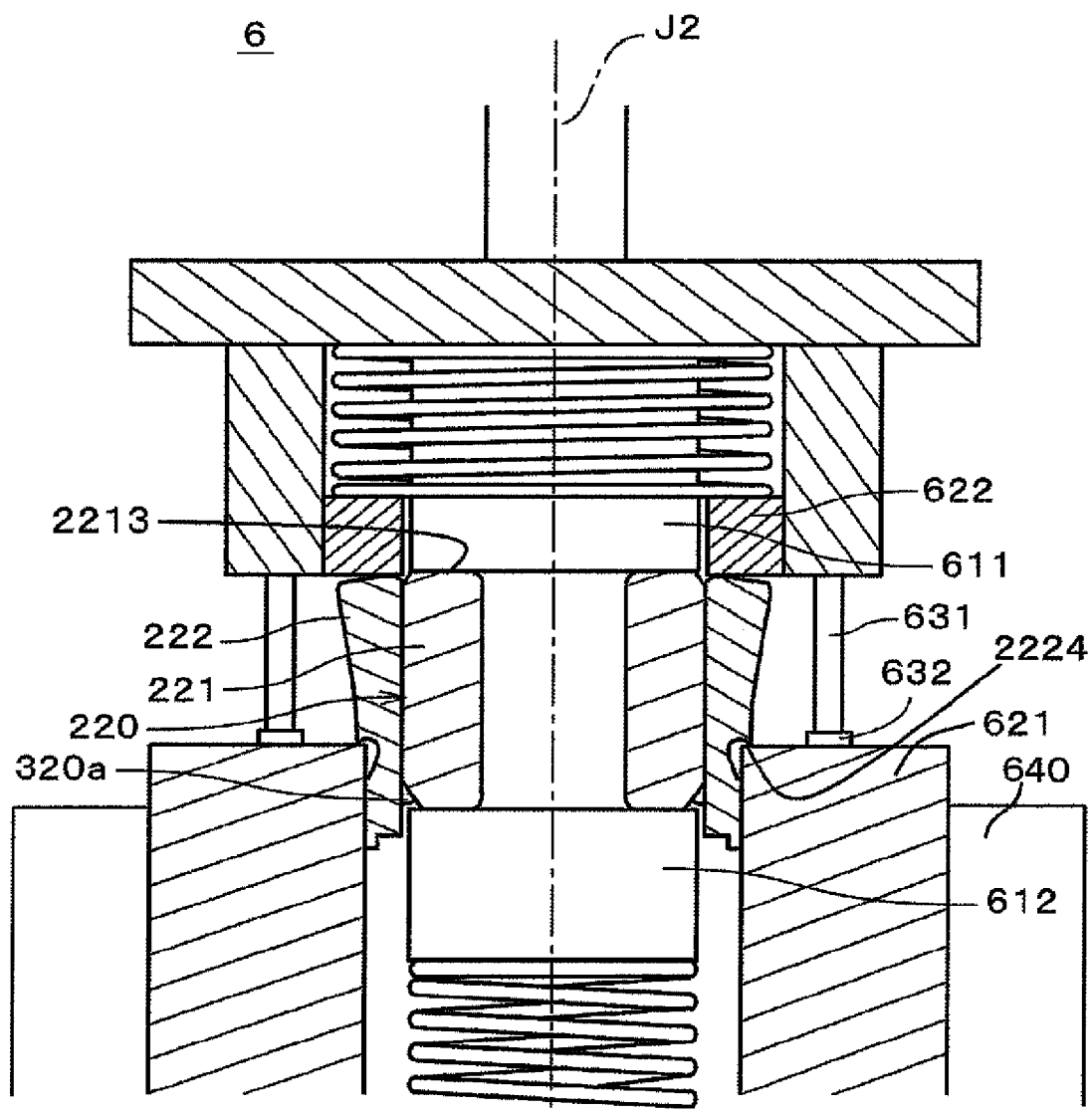
FIG. 9 is a view illustrating manufacture of the sleeve unit with a sleeve unit assembling device according to the second preferred embodiment of the present invention.

FIG. 7 is a chart illustrating a process flow of manufacturing the sleeve unit 22 according to a second preferred embodiment of the present invention, and FIGS. 8 and 9 are views illustrating manufacture of the sleeve unit 22. The configuration of the sleeve unit assembling device 6 according to the second preferred embodiment of the present invention will be approximately the same as that described in the detail description of the first preferred embodiment of the present invention, and detailed description will be made only of the features that are different. The configuration of the sleeve unit 22 to be manufactured and the motor 1 using the sleeve unit 22 according to the second preferred embodiment of the present invention is substantially the same as that described in FIG. 1.

In the present preferred embodiment of the present invention, an adhesive 320 which is different from that described in the first preferred embodiment of the present invention is used. The adhesive 320 is preferably a heat curable adhesive, more particularly a single component epoxy adhesive having a fast-curing property. In the present preferred embodiment of the present invention, in accordance with the examination based on the Japanese Industrial Standard C6521-1996, the adhesive 320 has 40 second or less cure time at 80 degree Celsius, and 15 second or less cure time at 110 degree Celsius. One example of such adhesive 320 is AE-750, commercially available from Ajinomoto-Fine-Techno.

The manufacturing method of the sleeve unit 22 using the adhesive 320 will be described below.

In order to manufacture the sleeve unit 22, as illustrated in FIG. 8, the first end portion 2215 of the sleeve 221 is firstly adsorbed from an upper side, so that the sleeve 221 is held by the sleeve holding portion 611 (step S21 in FIG. 7). Then, the heat curable adhesive 320 is applied to the inner surface 2222 of the sleeve housing 222 (step S22 in FIG. 7).

Then, the sleeve housing 222 is supported on the housing holding portion 621 to be engaged with the lower surface 2224 of the flange portion 2221 while facing the second end portion 2216 of the sleeve 221. In this step, the sleeve 221 and the sleeve housing 222 are held such that centers thereof are substantially aligned with the central axis J2 of the sleeve unit assembling device 6 (step S23 in FIG. 7).

Concurrently with completion of the placement of the sleeve housing 222 on the housing holding member 621, heat is applied to the sleeve housing 222. In particular, a heater 640 applies heat to the housing holding member 621, and the heat is transferred to the sleeve housing 2222 (step S24 in FIG. 7). The heating may not be started concurrently with the placement of the sleeve housing 222, the heat may be applied after the sleeve housing 222 is placed on the housing holding portion 621.

The upper supporting portion 64 then descends such that the sleeve holding portion 611 is brought closer to the housing holding portion 621, and the sleeve 221 is inserted into the sleeve housing 222 from the second end portion 2216 (step S25 in FIG. 7).

In course of insertion, the second end portion 2216 of the sleeve 221 is brought into contact with the first biasing portion 612, and the first coil spring 613 is elastically deformed so that the sleeve 221 is biased by the first biasing portion 612 toward the sleeve holding portion 611. After the sleeve 221 has contacted the first biasing portion 612, adsorption of the sleeve 221 by the sleeve holding portion 611 may be halted. After the sleeve 221 has contacted the first biasing portion 612, adsorption of the sleeve 221 by the sleeve holding portion 611 may be halted.

At the same time, in course of inserting the sleeve 221, the upper portion of the sleeve housing 222 is brought into contact with the second biasing portion 622, so that the second coil spring 623 is elastically deformed and the sleeve housing 222 is biased toward the housing holding portion 621.

Then, as illustrated in FIG. 9, when a distal end of the pin 631 contacts the pin contacting portion 632, insertion of the sleeve 221 into the sleeve housing 222 is halted. Accordingly, a relative position of the housing holding portion 621 with respect to the sleeve holding portion 611 is accurately determined, and relative positions in the direction along the central axis J2 of the sleeve 221 in contact with the sleeve holding portion 611 and the sleeve housing 222 in contact with the housing holding portion 621 are accurately determined.

During insertion, the adhesive 320 is spread by the second end portion 2216 of the sleeve 221 such that the adhesive 320 is held between the outer surface of the sleeve 221 and the inner surface of the sleeve housing 222. As shown in FIG. 9, a extra adhesive 320a pushed out is held between the adhesive holding portion 56 of the sleeve 221 and the inner surface 2222 of the sleeve housing 222. The amount of the adhesive 320 to be applied in step S22 is predetermined such that the pushed out adhesive 320a is appropriate in amount while variation in applied amount is taken into consideration.

Then, the sleeve 221 and the sleeve housing 222 are held for a predetermined time, and due to the heat transferred from the heater to the sleeve housing 222 via the housing holding member 621 the adhesive 320 is cured to fix the sleeve 221 to the sleeve housing 222.

On completion of fixation, the sleeve holding portion 611 and the housing holding portion 621 are separated from each other, and the sleeve 221 and the sleeve housing 222 are taken out.

The sleeve 221 and the sleeve housing 222 may be placed in a thermostatic oven maintained at 90 degree Celsius for about an hour for removing gas remaining in the adhesive 320.

In the present preferred embodiment of the present invention, the adhesive 320 is cured while the sleeve 221 and the sleeve housing 222 are accurately positioned. Furthermore, since the adhesive 320 has the fast-curing property, the sleeve 221 and the sleeve housing 222 are fixed to each other in a shorter time comparing with the adhesive 220 described in the first preferred embodiment of the present invention. In addition, by using the epoxy adhesive as the adhesive 320, the sleeve 221 and the sleeve housing 222 are solidly fixed to each other. Through the configuration, manufacturing time of the sleeve unit 22 is shortened and manufacturing cost is reduced, thus productivity of the sleeve unit 22 is increased.

Third Preferred Embodiment

Figure 10:
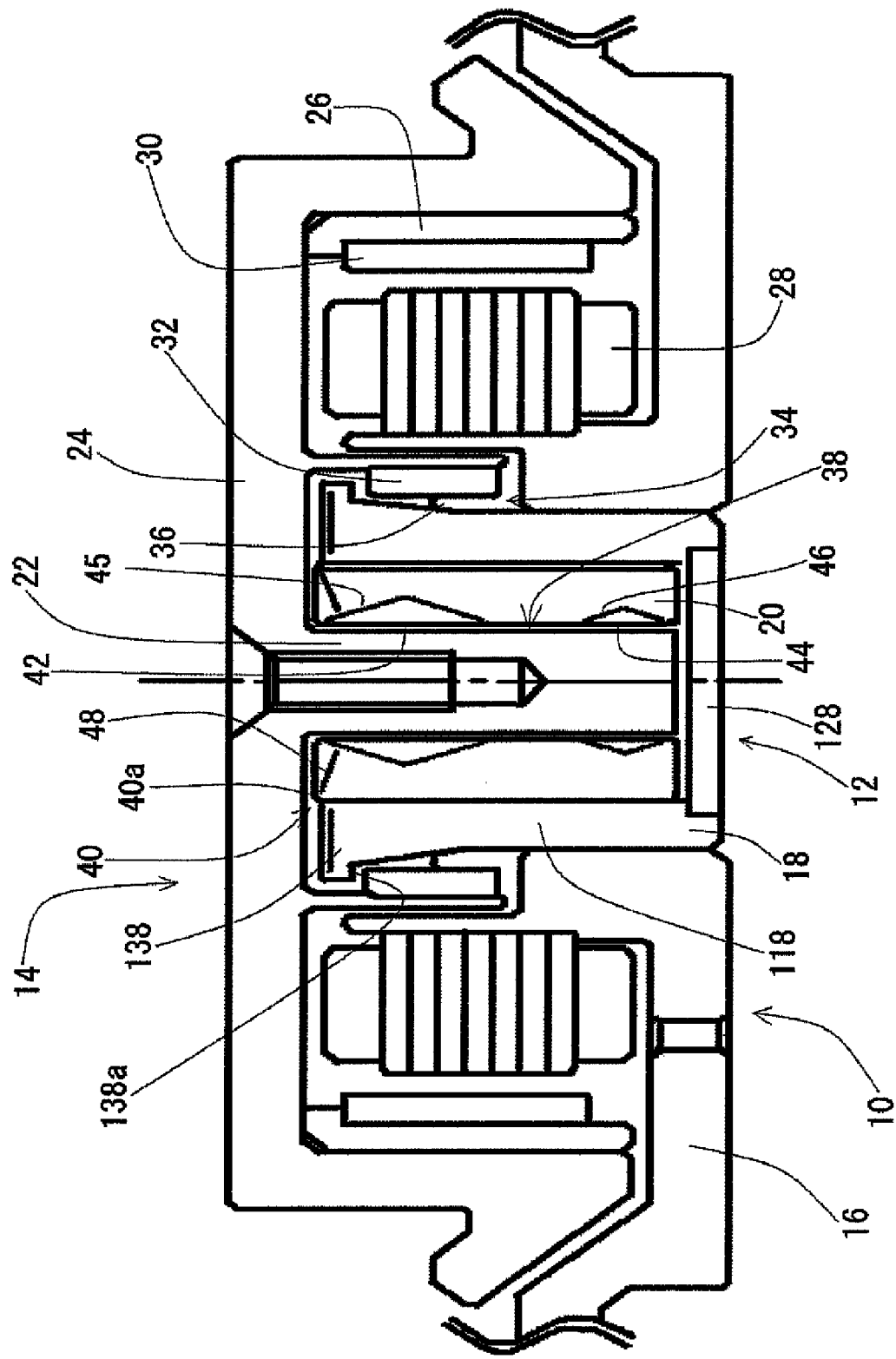
FIG. 10 is a vertical cross sectional view illustrating a motor according to a third preferred embodiment of the present invention.

With reference to FIG. 10, a third preferred embodiment of the present invention will be described in detail. FIG. 10 is a cross sectional view illustrating a motor according to the third preferred embodiment of the present invention.

The motor according to the present preferred embodiment of the present invention includes a static portion 10, bearing assembly 12, and a rotor portion 14.

The static portion 10 includes a base plate 16 having a through hole arranged substantially the center thereof. In the through hole, the bearing assembly 12 is arranged and fixed to the base plate 16.

The bearing assembly 12 includes a sleeve 20 having a substantially cylindrical shape into which a shaft 22 is inserted, and a sleeve housing 18 having a substantially cylindrical shape with a base into which the sleeve 20 is arranged and fixed to the base plate 16 in the through hole.

The sleeve housing 18 includes a body portion 118 having a lower portion arranged in the through hole of the base plate 16 and fixed thereto, and a flange portion 138 arranged axially above the body portion 118 and radially outwardly extending from an upper portion of the body portion 118. The motor according to the present preferred embodiment of the present invention has a body portion 118 having a longer axial length than that of the lower portion 2223 of the sleeve unit 22 (see FIG. 2), and a flange portion 138 having a shorter radial length than that of the flange portion 2221 of the sleeve unit 22 (see FIG. 2). A lower opening of the sleeve housing 18 is closed with a seal cap 128. Alternatively, the sleeve housing 18 and the seal cap 128 may be formed as a single member having a substantially cup shape.

The sleeve housing 18 may be made of a metal material (e.g., stainless steel, aluminum alloy, copper, copper alloy and the like), resin, or the like. As described in the first preferred embodiment of the present invention, the sleeve 20 is molded from a porous, oil-impregnated sintered material. The sleeve 20 is fixed to the sleeve housing 18 with an adhesive. The adhesive may be selected one or more from a group including an anaerobic adhesive, an anaerobic and ultraviolet curing adhesive, a heat curable adhesive, and the like.

The rotor portion 14 includes the shaft 22, a rotor hub 24, a yoke 26, and a rotor magnet 30. The rotor hub 24 and the shaft 22 are integrally formed as a single member. The yoke 26 is arranged radially outer portion of the rotor hub 24, and the rotor magnet 30 radially opposes an armature 28 defining a portion of the static portion 10 via a gap defined therebetween.

The rotor portion 14 further includes an annular member 32. The annular member 32 is fixed to the rotor hub 24 such that a radially inner surface of the annular member radially opposes an axially upper portion of the body portion 118 via a outside gap 34 defined therebetween. An outer surface of the body portion 118 is constricted at the upper portion thereof such that the diameter gradually decreases toward an axially lower direction. The inner surface of the annular member 32 which opposes the radially outer surface of the flange portion 2221 is of constant diameter. Through the configuration, a boundary surface of the lubricating oil retained in the bearing assembly 12 meets outside air in the outside gap 34, and is forms a meniscus under the agency of capillary action and surface tension, defining a taper seal portion 36, whereby the outside gap 34 functions as an oil buffer, preventing outflow of the lubricating oil.

There is provided an upper gap 40 defined between upper end surfaces of the sleeve housing 18 and the sleeve 20 and a lower surface of the rotor hub 24, and a radial gap 38 defined between an outer surface of the shaft 22 and the inner surface of the sleeve 20. These gaps are formed continuous and filled with the lubricating oil without interruption. The lubricating oil meets outside air only in the taper seal portion 36.

In the radial gap 38, an upper radial dynamic pressure bearing portion 42 and a lower radial dynamic pressure bearing portion 44 axially separate from each other are defined. At a portion of the inner surface of the sleeve 20 defining a part of the upper radial dynamic pressure bearing portion 42 includes a radial dynamic pressure generating grooves arrayed in a herringbone shape (an upper groove array 45). Similarly, another portion of the inner surface of the sleeve 20 defining a part of the lower radial dynamic bearing portion 44 includes a radial dynamic pressure generating grooves arrayed in a herringbone shape (a lower groove array 46).

Further, a thrust dynamic pressure bearing 40a is defined between an upper end surface of the sleeve 20 and a lower surface of the rotor hub 24. In the upper end surface of the sleeve 20, dynamic pressure generating grooves arrayed in a predetermined shape such as a spiral shape or a herringbone shape (i.e., a thrust groove array 48).

A lower surface of the flange portion 138 axially opposes to an upper surface of the annular member via a gap defined therebetween. In addition, a radially outer surface of the flange portion 138 is arranged radially outer from an inner surface of the annular member 32. Through the configuration, it is possible to prevent the rotor hub 24 from being axially upwardly removed from the sleeve housing 18.

In the present preferred embodiment of the present invention as well, a relative position of the upper end surface of the sleeve 20 with respect to the axially lower surface 138a of the flange portion 138 is accurately and easily determined with use of the sleeve unit assembling device 6, facilitating the manufacture of the sleeve housing 18. In addition, the relative position is accurately determined with the sleeve unit assembling device 6, some portions of the sleeve housing 18 such as the upper surface of flange portion 138 may not be processed with a great dimensional precision, making the manufacturing cost of the sleeve housing 138 lower.

While the preferred embodiments of the present invention have been described above, the present invention is not limited thereto but can be modified in various ways.

For example, while the sleeve 221 and the sleeve housing 222 are held after the adhesive 220 is applied thereto in the above embodiment, application of the adhesive can be performed after the sleeve 221 and the sleeve housing 222 are held. The order of holding the sleeve and holding the sleeve housing may also be appropriately altered.

Further, the first end portion 2215 of the sleeve 221 can be inserted into the sleeve housing 222 from the lower side of the sleeve housing 222 and fixed thereto.

The motor according to the preferred embodiments of the present invention is so-called inner-rotor motors, in which the armature is arranged radially outside the rotor magnet. Alternatively, the motor may be so-called outer-rotor motors, in which the armature is arranged radially inside of the rotor magnet.

Further, the bearing assembly may adopt, for example, so called a gas dynamic pressure bearing in which air is utilized as fluid.

The motor according to the above described embodiment may also be used as a drive source of a device other than a hard disk device (for example, a disk drive device such as a removable disk device).

What is claimed is:

1. A method of manufacturing a sleeve unit for use in a fluid dynamic assembly that includes a sleeve and a sleeve housing, the method comprising the steps of:
   a) arranging the sleeve to have a hollow substantially cylindrical shape centered on a center axis including an upper bearing surface on an upper axial side of the sleeve, and arranging the sleeve housing to have a hollow substantially cylindrical shape including an inner diameter substantially the same as or greater than an outer diameter of the sleeve, such that the sleeve and the sleeve housing are axially separated from each other, the sleeve housing including a flange portion and a lower portion arranged axially below the flange portion, a lower surface of the flange portion extending approximately radially toward the lower portion;
   b) moving the sleeve toward the sleeve housing along the center axis and inserting the sleeve into the sleeve housing to set a distance between the upper bearing surface and the lower surface along the center axis to be equal to, or approximately equal to, a predetermined distance; and
   c) fixing the sleeve to the sleeve housing; wherein
   the sleeve includes an array of dynamic pressure generating grooves;
   a radially outer diameter of the flange portion is greater than a radially outer diameter of the lower portion; and
   in the step b):
      the upper bearing surface of the sleeve is brought into contact with a lower surface of a sleeve holding portion and is biased toward the sleeve holding portion;
      the lower surface of the flange portion of the sleeve housing is brought into contact with an upper surface of a sleeve housing holding portion and is biased toward the sleeve housing holding portion; and
      a distance along the center axis between the lower surface of the sleeve holding portion and the upper surface of the sleeve housing holding portion is set to the predetermined distance.

2. The method as set forth in claim 1, wherein in the step b), a lower end portion of the sleeve and an upper end surface of the sleeve housing are arranged to oppose one another in an axial direction, and the sleeve and the sleeve housing are moved relative to each other to insert the sleeve into the sleeve housing.

3. The method as set forth in claim 1, wherein in the step b), an upper end portion of the sleeve and a lower end surface of the sleeve housing are arranged to oppose one another in an axial direction, and the sleeve and the sleeve housing are moved relative to each other to insert the sleeve into the sleeve housing.

4. The method as set forth in claim 1, further comprising a step of applying an adhesive to at least one of a radially outer surface of the sleeve and a radially inner surface of the sleeve housing, wherein
   the step of applying the adhesive is performed prior to the step b); and
   the sleeve and the sleeve housing are fixed to each other by the adhesive in the step c).

5. The method as set forth in claim 4, wherein
   the adhesive is a heat curable adhesive; and
   heat is applied to at least one of the sleeve and the sleeve housing so as to cure the heat curable adhesive to fix the sleeve and the sleeve housing to each other.

6. The method as set forth in claim 5, wherein in the step b):
   the upper bearing surface of the sleeve is brought into contact with a lower surface of a sleeve holding portion and is biased toward the sleeve holding portion;
   the lower surface of the flange portion of the sleeve housing is brought into contact with an upper surface of a sleeve housing holding portion and is biased toward the housing holding portion; and
   the heat is applied to the housing holding portion and is transferred to the sleeve housing via the housing holding portion.

7. The method as set forth in claim 4, wherein:
   the sleeve includes a connecting surface arranged to connect an axially lower surface of the sleeve and the radially outer surface having a diameter greater than a diameter of the axially lower surface; and
   through the steps b) and c), a portion of the adhesive is arranged radially between the radially inner surface of the sleeve housing and the radially outer surface of the sleeve, and another portion of the adhesive is arranged radially between the connecting surface and the radially inner surface of the sleeve housing.

8. The method as set forth in claim 7, wherein the sleeve includes another connecting surface connecting the upper bearing surface of the sleeve and the radially outer surface of the sleeve, and a width of the another connecting surface in the radial direction is smaller than a width of the connecting surface connecting the axially lower surface of the sleeve and the radially outer surface of the sleeve.

9. The method as set forth in claim 7, wherein the adhesive is an anaerobic and ultraviolet curing adhesive, and ultraviolet light is irradiated to the another portion of the adhesive after the step b) is performed.

10. The method as set forth in claim 1, further comprising a step of applying an anaerobic adhesive to at least one of a radially outer surface of the sleeve and a radially inner surface of the sleeve housing.

11. The method as set forth in claim 1, further comprising a step of applying a heat curable adhesive to at least one of a radially outer surface of the sleeve and a radially inner surface of the sleeve housing, wherein the step of applying the heat curable adhesive is performed prior to the step b) is performed.

12. The method as set forth in claim 11, wherein the heat curable adhesive is a single component adhesive having 40 second or less cure time at 80 degree Celsius and 15 second or less cure time at 110 degree Celsius in accordance with an examination based on the Japanese Industrial Standard C6521-1996.

13. The method as set forth in claim 1, wherein the upper bearing surface includes the array of dynamic pressure generating grooves.

14. The method as set forth in claim 1, wherein the sleeve includes a lower bearing surface on an axially lower side thereof, and the lower bearing surface includes the array of dynamic pressure generating grooves.

15. The method as set forth in claim 1, wherein the sleeve is a porous member formed by pressure-molding a powder material.

* * * * *